Patented Feb. 13, 1951

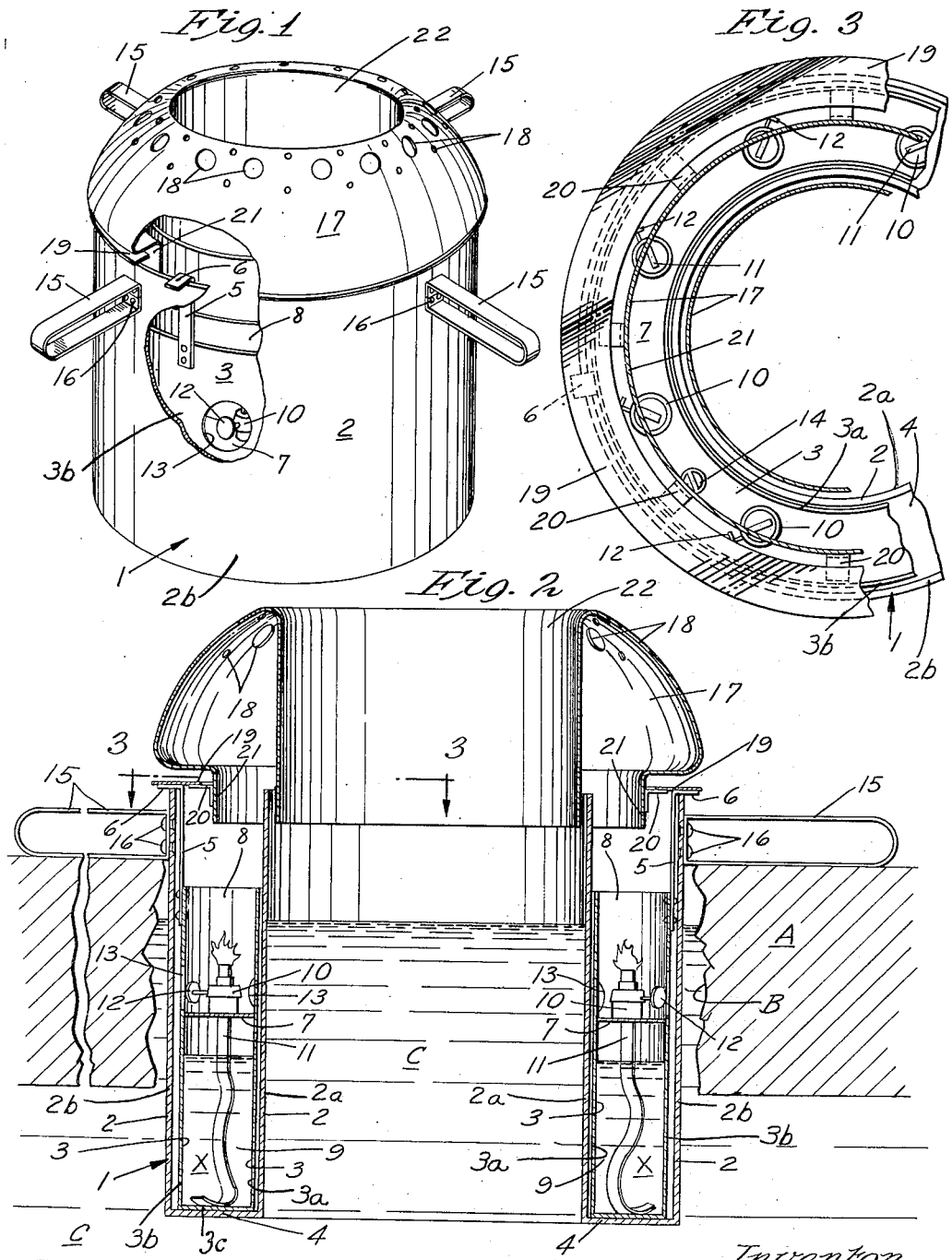

2,541,328

UNITED STATES PATENT OFFICE 2,541,328

ICE-FISHING HEATER

Henry O. Boklep, Belview, Minn.

Application May 19, 1949, Serial No. 94,244

7 Claims. (Cl. 126—360)

My invention relates generally to heaters, and, more specifically, to heaters adapted for use in ice fishing to prevent freezing of the liquid in a hole cut through the ice on a body of water.

It is frequently necessary, when fishing through a hole in the ice on a lake or river, particularly when the weather is extremely cold, to use a chopper and a ladle to remove ice as it forms in the hole. The primary object of my invention is the provision of a heater which may be suspended in the hole and which will maintain the temperature of the water in the hole above the freezing point.

Another highly important object of my invention is the provision of a heater as set forth, which, during its use, will not interfere with the fishing operation.

Still another object of my invention is the provision of a heater which will provide warmth for the hands of the fisherman during the fishing operation.

A still further object of my invention is the provision of a heater as set forth, which will maintain the water within the hole in the ice above freezing temperature, but will not melt the ice from which it is suspended.

Another object of my invention is the provision of a heater which is inexpensive to produce, efficient in operation, rugged in construction, and extremely durable in use.

Other highly important objects and advantages of my invention will become apparent from the following detailed specification, appended claims, and attached drawings.

Referring to the drawings, wherein like characters indicate like parts throughout the several views:

Fig. 1 is a view in perspective of my novel heater, some parts being broken away;

Fig. 2 is a vertical axial sectional view of my novel heater suspended in a hole in the ice; and Fig. 3 is a fragmentary detail, partly in plan and partly in horizontal section, taken on the line 3—3 of Fig. 2.

My novel heater comprises a double-walled annular container 1 having an annular open-topped outer shell 2 formed by concentric inner and outer walls 2a and 2b, respectively, and the bottom wall 4, and an annular open-topped inner shell 3 contained within the annular channel of the outer shell 2. The inner shell 3 including inner and outer walls 3a and 3b, respectively, and the bottom wall 3c, rests upon the bottom wall 4 of the outer shell 2 and is provided with a plurality of circumferentially-spaced upwardly-extending brackets 5 riveted or otherwise secured to the upper end portion of the inner shell 3. The brackets 5 terminate in radially outturned end portions 6 which overlie the radially outer wall of the outer shell 2 for a purpose which will hereinafter become apparent.

The annular inner shell 3 is divided by a partition 7 into upper and lower compartments 8 and 9 which provide respectively a combustion chamber and a liquid fuel reservoir. As shown, the reservoir is adapted to hold liquid fuel such as kerosene or the like, indicated by the letter $x$. A plurality of circumferentially-spaced burner heads 10 are secured to the partition 7 within the combustion chamber 8 and are each provided with a wick 11 which depends through the partition 7 into the fuel $x$. Each burner is provided with adjusting mechanism having an adjustment knob or the like 12. The radially outer wall of the inner shell 3 is provided with a plurality of circumferentially-spaced openings 13, one each adjacent one of the knobs 12. The operator, when adjusting the wick 11, needs but to reach through the openings 13 to grasp the adjustment knob 12. An opening in the partition 7 is normally closed by a screw-threaded plug 14 which may be easily removed when it is desired to add fuel to the reservoir 9.

For suspending the container 1 through a hole in the ice, I provide a plurality, as shown four, of circumferentially-spaced radially outwardly-projecting arms 15 rigidly secured by rivets or the like 16 to the outer shell 2 adjacent its upper end. As illustrated in Fig. 2, the arms 15 are adapted to rest upon the top surface of the ice with the greater part of the container 1 extending downwardly through a hole chopped through the ice. In the drawings, the ice is indicated by the letter A, the hole therein indicated by B, and the water in the hole and beneath the ice by C. In most instances, the water C rises in the hole B to almost the level of the top surface of the ice A so that the container 1 is partly immersed therein with the top of the wick 11 below the surface of the water C.

To protect the flame from the burners 10 from high winds and from falling snow, I provide an annular hood 17 having spaced perforations 18 through which the gases of combustion exhaust to atmosphere. The hood 17 overlies the combustion chamber 8 and is supported from the container 1 by an annular plate 19 which rests upon the outturned ends 6 of the brackets 5. The hood 17 is secured to the annular plate 19 by circumferentially-spaced angle brackets 20 welded or otherwise rigidly secured to the annular plate 19 and to the depending flange 21 formed integrally with the hood 17.

It will be observed, particularly by reference to Figs. 2 and 3, that the annular plate 19 is radially outwardly spaced from the flange 21 of the hood 17, and that the radially outer wall of the inner shell 3 is inwardly spaced from the radially outer wall of the outer shell 2. It will also be seen that the outturned ends 6 of the brackets 5 support the annular plate 19 in spaced relation to the upper edge of the outer shell 2. When the burners are ignited, the gases of combustion travel upwardly interior of the flange 21 into the hood 17 and outwardly therefrom through the perforations 18. Air to support combustion is drawn downwardly between the flange 21 and the interior of the annular plate 19 as well as through the space between the plate 19 and the upper edge of the outer shell 2. The incoming air travels downwardly between the radially outer walls of the shells 2 and 3 and through the openings 13. Heat in the combustion chamber 8 is radiated through the walls of the shells 2 and 3, whereby to maintain the water C within the hole B at a temperature above the freezing point. A substantial percentage of the heat generated travels upwardly with the gases of combustion and is radiated upwardly and outwardly from the dome-like hood 17, thus providing a warming device for the fisherman. The arms 15 are of a size to radiate sufficient heat to prevent melting of the ice A therebeneath. Of course, the water C within the hole B will absorb most of the heat of the container 1 so that the arms 15 are maintained at a relatively low temperature. However, any remaining heat from the combustion chamber 8 which reaches the arms 15 is radiated therefrom to the atmosphere so that melting of the ice therebeneath is prevented.

The annular construction of the container 1 and the hood 17 provides a central opening 22 through which the fishing line and equipment is dropped. The opening 22 is of sufficient size to permit passage therethrough of fish which may be caught.

It will be noted, by reference to Figs. 1 and 2, that the inner shell 3 is substantially shorter in length than the outer shell 2. When it is desired to ignite the burners 10, the hood 17 is lifted off from the top of the container 1 and the shell 3 likewise lifted out of the shell 2 by means of the brackets 5. When the inner shell 3 is removed from the outer shell 2, access is had to the burner knobs 12 through the various openings 13. As shown, the inner shell 3 is capable of slight movements laterally of the outer shell 2 and the hood 17 is likewise capable of lateral movements with respect to the container 1. This arrangement permits lateral shifting of one shell with respect to the other and the hood 17 to compensate for inequalities in draft, such as would be caused by a high wind. My novel heater may be left within a hole in the ice overnight to obviate the necessity for chopping out ice which would otherwise form.

My invention has been thoroughly tested and found to be adequate for the accomplishment of the objectives set forth; and, while I have shown a preferred embodiment of my novel heater, it will be understood that the same is capable of modification without departure from the spirit and scope of the invention as defined in the claims.

What I claim is:

1. In a device of the class described, a double-walled annular container adapted to be suspended in a hole cut through the ice on a body of water, said container comprising concentric outer and inner annular shells, the latter being disposed within the annular channel of the former and radially spaced therefrom, a partition dividing said inner shell into axially-spaced upper and lower compartments, the lower one thereof comprising a liquid fuel reservoir and the other thereof comprising a combustion chamber, a plurality of circumferentially-spaced burners mounted on said partition in the combustion chamber each having a wick extending through said partition into the reservoir, said inner shell having a plurality of circumferentially-spaced ports in the outer wall thereof intermediate said partition and the upper end of said burners whereby to admit air from the space between said shells to said combustion chamber, and means for suspending the container in the hole, said means comprising a plurality of arms projecting radially outwardly from said outer shell adjacent the upper end thereof and engageable with the top surface of the ice.

2. The structure defined in claim 1 in which said supporting arms are of a size to radiate sufficient heat to prevent melting of the ice in contact therewith.

3. The structure defined in claim 1 in further combination with a perforate annular hood overlying said combustion chamber and supported by said container.

4. In a device of the class described, a double-walled annular container adapted to be suspended in a hole cut through the ice on a body of water, said container comprising concentric outer and inner annular shells, the latter being disposed within the annular channel of the former and radially spaced therefrom, a partition dividing said inner shell into axially-spaced upper and lower compartments, the lower one thereof comprising a liquid fuel reservoir and the other thereof comprising a combustion chamber, a plurality of circumferentially-spaced burners mounted on said partition in the combustion chamber each having a wick extending through said partition into the reservoir, said inner shell having a plurality of circumferentially-spaced ports in the outer wall thereof intermediate said partition and the upper end of said burners whereby to admit air from the space between said shells to said combustion chamber, a plurality of circumferentially-spaced brackets extending upwardly from the upper end portion of said inner shell and terminating in radially outturned portions overlying the outer wall of said outer shell, an annular perforate hood supported on said outturned end portions and overlying the open tops of said shells, and means for suspending the container in said hole.

5. The structure defined in claim 4 in which said means for suspending the container in the hole comprises a plurality of arms projecting radially outwardly from said outer shell adjacent the upper end thereof and engageable with the top surface of the ice.

6. In a device of the class described, an annular water-tight container adapted to be inserted in a hole cut through the ice on a body of water and including spaced concentric inner and outer walls and a normally open upper end portion, said inner wall providing a vertically disposed fishing aperture throughout its length and said outer wall adjacent its upper portion being provided with a plurality of circumferentially-spaced radially projecting supporting arms engageable with the top surface of the ice, heating means within said container below the level of said supporting arms, and an annular hood removably secured to the open upper end portion of said container, said hood forming an extension to the fishing aperture defined by the inner wall of said container.

7. The structure defined in claim 6 in which said heating means is ignitable and in which said hood provides circulation of air in and to said heating means.

HENRY O. BOKLEP.

REFERENCES CITED

The following references are of record in the file of this patent:

UNITED STATES PATENTS

| Number | Name | Date |
|---|---|---|
| 446,879 | Montague et al. | Feb. 24, 1891 |
| 472,128 | Joyce | Apr. 5, 1892 |
| 593,047 | Dorsey | Nov. 2, 1897 |
| 653,407 | Stocum et al. | July 10, 1900 |
| 662,738 | Rascher | Nov. 27, 1900 |
| 703,215 | Pinney | June 24, 1902 |
| 1,114,394 | Sieger | Oct. 20, 1914 |
| 1,322,024 | Kaiser | Nov. 18, 1919 |

FOREIGN PATENTS

| Number | Country | Date |
|---|---|---|
| 139,788 | Switzerland | July 16, 1930 |